(12) United States Patent
Perwass et al.

(10) Patent No.: US 11,202,002 B2
(45) Date of Patent: Dec. 14, 2021

(54) METHOD AND PREPROCESSING DEVICE FOR PREPROCESSING CAMERA RAW DATA OF AN IMAGE SENSOR OF A CAMERA

(71) Applicant: Robert Bosch GmbH, Stuttgart (DE)

(72) Inventors: Christian Perwass, Gettorf (DE); Oliver Lange, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/000,837

(22) Filed: Aug. 24, 2020

(65) Prior Publication Data

US 2021/0075962 A1    Mar. 11, 2021

(30) Foreign Application Priority Data

Sep. 5, 2019  (DE) .......................... 102019213523.4

(51) Int. Cl.
*H04N 5/232*     (2006.01)

(52) U.S. Cl.
CPC ..... *H04N 5/23235* (2013.01); *H04N 5/23218* (2018.08); *H04N 5/23232* (2013.01); *H04N 5/23245* (2013.01)

(58) Field of Classification Search
CPC ........... H04N 5/23218; H04N 5/23232; H04N 5/23235; H04N 5/23245
See application file for complete search history.

(56) References Cited

U.S. PATENT DOCUMENTS

| | | | | |
|---|---|---|---|---|
| 5,949,483 A | * | 9/1999 | Fossum | H04N 5/3575 348/303 |
| 6,839,452 B1 | * | 1/2005 | Yang | H03F 3/082 348/E3.02 |
| 7,106,374 B1 | * | 9/2006 | Bandera | H04N 5/23232 348/308 |
| 2007/0250898 A1 | * | 10/2007 | Scanlon | G06K 9/00536 725/135 |
| 2009/0225189 A1 | * | 9/2009 | Morin | H04N 5/345 348/229.1 |

FOREIGN PATENT DOCUMENTS

DE    102014218627 A1    3/2016

* cited by examiner

*Primary Examiner* — Daniel M Pasiewicz
(74) *Attorney, Agent, or Firm* — Norton Rose Fulbright US LLP; Gerard Messina

(57) ABSTRACT

A method for preprocessing camera raw data of an image sensor of a camera. The method includes a step of reading in, a step of setting, a step of reducing, and a step of outputting. In the step of reading in, a raw data signal is read in, which encompasses camera raw data detected by the image sensor at a detection point in time. In the step of setting, a preprocessing algorithm for reducing the resolution of the camera raw data is set, using at least one setting signal. In the step of reducing, the resolution of the camera raw data is reduced, using the preprocessing algorithm set in the step of setting, to obtain a preprocessed camera signal which represents a preprocessed camera image. In the step of outputting, the preprocessed camera signal is output to an image processing unit.

15 Claims, 3 Drawing Sheets

METHOD AND PREPROCESSING DEVICE FOR PREPROCESSING CAMERA RAW DATA OF AN IMAGE SENSOR OF A CAMERA

CROSS REFERENCE

The present application claims the benefit under 35 U.S.C. § 119 of German Patent Application No. DE 102019213523.4 filed on Sep. 5, 2019, which is expressly incorporated herein by reference in its entirety.

FIELD

The present invention directed to a device and to a method for preprocessing camera raw data. The present approach also relates to a computer program.

BACKGROUND INFORMATION

German Patent Application No. DE 10 2014 218 627 A1 describes a method and a control unit for operating an image sensor.

SUMMARY

The present invention provides a method for preprocessing camera raw data of an image sensor of a camera, a preprocessing device which uses this method, as well as finally a corresponding computer program. The measures described herein allow advantageous refinements of and improvements on the device described herein.

The advantages achievable by example embodiments of the present invention are that camera raw data are preprocessed prior to being processed in an image processing unit to optimally adapt an amount and a content of the camera raw data to an intended application. In this way, a memory bandwidth and a transmission bandwidth may be reduced.

In accordance with an example embodiment of the present invention, a method for preprocessing camera raw data of an image sensor of a camera includes a step of reading in, a step of setting, a step of reducing, and a step of outputting. In the step of reading in, a raw data signal is read in, which encompasses camera raw data detected by the image sensor at a detection point in time. In the step of setting, a preprocessing algorithm for reducing the resolution of the camera raw data is set, using at least one setting signal. In the step of reducing, the resolution of the camera raw data is reduced, using the preprocessing algorithm set in the step of setting, to obtain a preprocessed camera signal which represents a preprocessed camera image. In the step of outputting, the preprocessed camera signal is output to an image processing unit.

This example method may, for example, be implemented in software or hardware or in a mixed form made up of software and hardware, for example in a control unit.

The camera may be a vehicle camera for a vehicle, for example.

The vehicle camera may be provided for recording camera images during a trip of the vehicle, for example for a driver assistance system of the vehicle. As an alternative, however, it may also be a camera for the robotics field or a monitoring camera. The image processing unit may, for example, be designed to carry out an object recognition based on the preprocessed camera signal. Conventional methods may be resorted to in the process. Since increasingly more cameras are used for driver assistance systems, for example, and the requirements with regard to image resolution and temporal sampling are also rising, a data traffic and data volume of camera raw data continues to increase. The example method described herein may advantageously allow camera raw data to be preprocessed prior to a conventional image processing, so that more data may be processed within a very short time. The image sensor may include a multitude of pixels and be designed to provide one pixel signal per pixel. The raw data signal may encompass a multitude of pixel signals of a multitude of pixels or of all pixels. In this way, the raw data signal may map the entire image or an image area. The raw data signal may be a not yet preprocessed signal. The preprocessing algorithm may encompass at least one suitable method for reducing the resolution of the data transmitted by the raw data signal. Conventional methods may be resorted to in the process. The setting signal may be used to set a rate of the data reduction. In this way, the data may, for example, be reduced by a first factor when the setting signal has a first value, and by a second factor, or may not be reduced, when the setting signal has a second value.

Within the meaning of the approach described here, "resolution" shall be understood to mean a spatial resolution and, in addition or as an alternative, a temporal resolution and, in addition or as an alternative, a bit depth. In this way, a reduction of the resolution may be understood to mean a spatial data reduction, a temporal data reduction and a data reduction related to the data themselves, it being possible to apply the different options for data reduction in an arbitrarily combined manner or also alone. Known methods may be resorted to for carrying out a corresponding data reduction. In this way, the spatial and, in addition or as an alternative, the temporal resolution of the camera raw data may thus be reduced in the step of reducing. In addition or as an alternative, the bit depth of the camera raw data may accordingly be reduced to reduce the resolution. In this way, a content and, in addition or as an alternative, an amount of the camera raw data may be reduced to require less memory bandwidth and, in addition or as an alternative, transmission bandwidth.

The example method in accordance with the present invention may furthermore include a step of detecting the camera raw data, using the image sensor. For this purpose, the image sensor may include a pixel array. Conventional image sensors may be resorted to in the process.

The step of reading in, setting, reducing, and outputting may be carried out using the image sensor. This allows a sensor-internal preprocessing. As a result of this preprocessing integrated into the image sensor, a signal chain may be kept as short as possible.

As an alternative, the steps of reading, setting, reducing and outputting may be carried out using a preprocessing device situated externally of the image sensor and the image processing unit. This sensor-external preprocessing is carried out, however, still prior to and separately from the evaluation of the data in the image processing unit.

The method may include a step of identifying, in which a change between the camera raw data and preceding camera raw data is identified, using the preprocessing algorithm, to detect a dynamic movement. The method may furthermore include a step of defining, in which a setting parameter of the setting signal is set as a function of a parameter of the identified change. A dynamic movement of an object may, for example, be identified as the dynamic movement. For example, the setting parameter may determine, for example increase or reduce, a temporal and, in addition or as an alternative, a spatial resolution or a sampling rate. According to one specific embodiment of the present invention, an image area mapped by the raw data signal may thus be further processed at a high temporal sampling rate and, in addition or as an alternative, a high image resolution when a movement, for example a dynamically moving object, was identified in the image area. Conversely, according to one specific embodiment of the present invention, an image area in which no dynamically moving object was identified may be further processed at a lower temporal sampling rate and, in addition or as an alternative, at a lower image resolution. This enables a high resolution of only relevant image areas, and makes it possible to neglect irrelevant image areas.

According to one specific embodiment of the present invention, the method may include a step of establishing, in which a setting parameter of a further setting signal is established, using an external signal which represents an instantaneous piece of driving information of a trip of the vehicle. The instantaneous piece of driving information may be a steering angle, a vehicle speed, and, in addition or as an alternative, a movement of the camera itself. In this way, an externally dynamically regulated preprocessing may take place.

The method may furthermore include a step of further establishing, in which a setting parameter of an additional setting signal is established, using a further external signal which represents an object detection of the image processing unit. In this way, further external signals of an external object detection unit may also be taken into consideration.

It is furthermore advantageous when the method includes a step of processing, in which the preprocessed camera signal is processed, using the image processing unit. In this way, for example, an object detection may take place, using the image processing unit.

In the step of setting, a first sub-algorithm for transforming the camera raw data may be set, using a setting signal, and a second sub-algorithm for reducing the resolution of intermediate data may be set, using the or a further setting signal. In the step of reducing, the resolution of the camera raw data may be transformed, using the first sub-algorithm set in the step of setting, to obtain the intermediate data, and the resolution of the intermediate data may be reduced, using the second sub-algorithm set in the step of setting, to obtain second intermediate data. In this way, a multilayer preprocessing may take place in consecutive layer groups to enable a rapid preprocessing of the camera data, and to prevent a data jam.

The first sub-algorithm may encompass a first image processing layer and a first decision layer, the first decision layer being designed to make a first output decision for outputting the camera raw data, using a first signal of the first image processing layer, the second sub-algorithm encompassing a second image processing layer and a second decision layer, the second decision layer being designed to make a second output decision for outputting the second intermediate data, using a second signal of the second image processing layer. In this way, initially a preprocessing may be carried out in the first sub-algorithm, before the data reduction takes place in the second sub-algorithm.

In the step of outputting, the camera raw data or the second intermediate data may be output as the preprocessed camera signal, as a function of the first output decision and the second output decision. Depending on the situation, in this way a more or less drastically reduced camera data may be resorted to.

The approach presented here furthermore creates a preprocessing device which is designed to carry out, control or implement the steps of one variant of a method described here in corresponding units. The object underlying the approach may also be achieved quickly and efficiently by this embodiment variant of the approach in the form of a preprocessing device.

For this purpose, the preprocessing device may include at least one processing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data which are embedded into a communication protocol. The processing unit may be a signal processor, a microcontroller or the like, for example, it being possible for the memory unit to be a Flash memory, an EEPROM or a magnetic memory unit. The communication interface may be designed to read in or output data wirelessly and/or in a hard-wired manner, a communication interface which may read in or output hard-wired data, these data may be read in, for example electrically or optically, from a corresponding data transmission line or may be output into a corresponding data transmission line.

A preprocessing device may presently be understood to mean an electrical device which processes sensor signals and outputs control and/or data signals as a function thereof. The preprocessing device may include an interface which may be designed as hardware and/or software. In the case of a hardware design, the interfaces may, for example, be part of a so-called system ASIC which includes a wide variety of functions of the preprocessing device. However, it is also possible for the interfaces to be separate integrated circuits, or to be at least partially made up of discrete elements. In the case of a software design, the interfaces may be software modules which are present on a microcontroller, for example, alongside other software modules.

In one advantageous embodiment of the present invention, the preprocessing device may, for example, resort to sensor signals, such as a raw data signal which encompasses camera raw data detected by an image sensor at a detection point in time. The preprocessing device may include a read-in unit, which is designed to read in the raw data signal, a setting unit, which is designed to set a preprocessing algorithm for reducing the resolution of the camera raw data using a setting signal, a reducing unit, which is designed to reduce the resolution of the camera raw data, using the preprocessing algorithm set in the setting unit to obtain the preprocessed camera signal, which represents a preprocessed camera image, and an output unit, which is designed to output the preprocessed camera signal to an image processing unit. The preprocessing device may also include the image sensor or be integrated into the image sensor or be situated close to the sensor.

In addition, a computer program product or computer program is advantageous, having program code which may be stored on a machine-readable carrier or memory medium such as a semiconductor memory, a hard disk memory or an optical memory, and which is used to carry out, implement and/or control the steps of the method according to one of the specific embodiments described above, in particular if the program product or program is executed on a computer or a device.

Exemplary embodiments of the present invention described herein are shown in the figures and are described in greater detail in the description below.

BRIEF DESCRIPTION OF THE DRAWINGS

In the following description of favorable exemplary embodiments of the present invention, identical or similar reference numerals are used for similarly acting elements shown in the different figures, and a repeated description of these elements is dispensed with.

DETAILED DESCRIPTION OF EXAMPLE EMBODIMENTS

Figure 1:
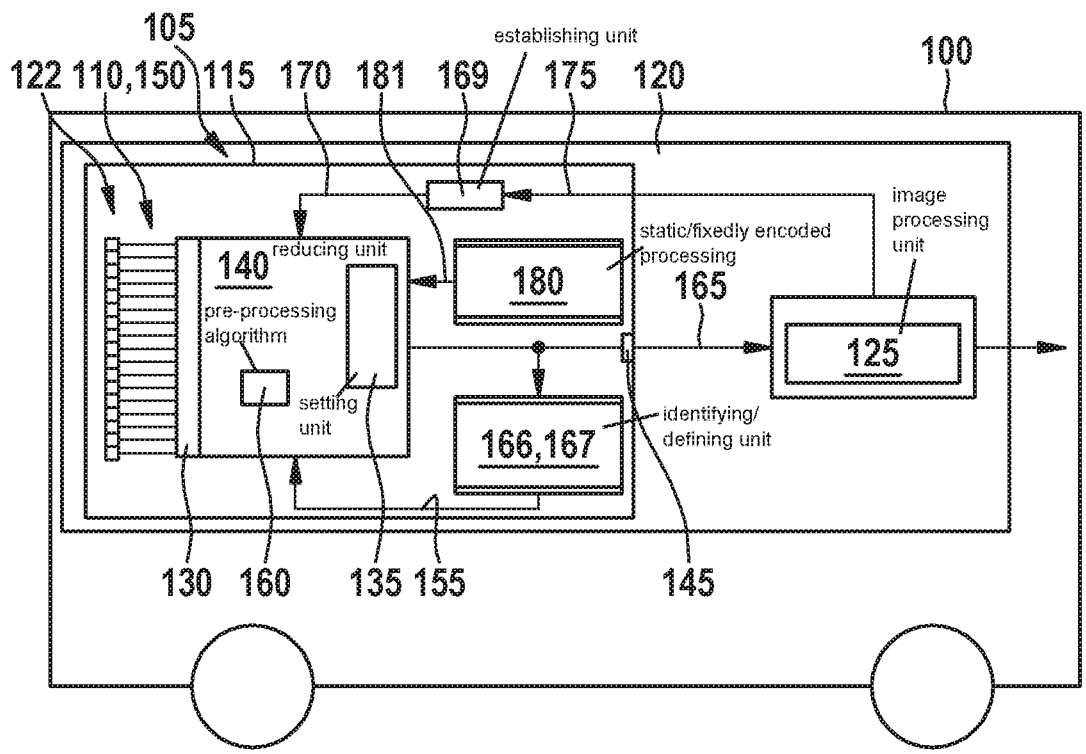
FIG. 1 shows a schematic representation of a vehicle, including a block diagram of a preprocessing device for preprocessing camera raw data of an image sensor of a camera according to one exemplary embodiment of the present invention.

FIG. 1 shows a schematic representation of a vehicle 100, including a block diagram of a preprocessing device 105 for preprocessing camera raw data 110 of an image sensor 115 of a camera 120 according to one exemplary embodiment.

Preprocessing device 105 according to this exemplary embodiment is situated at or in vehicle 100 only by way of example. According to an alternative exemplary embodiment, preprocessing device 105 is employed for use in the robotics field or in connection with a monitoring camera.

According to this exemplary embodiment, camera 120 is a vehicle camera of vehicle 100 situated at or in vehicle 100. According to this exemplary embodiment, camera 120 includes image sensor 115 including a pixel array 122 and an image processing unit 125. According to an alternative exemplary embodiment, image processing unit 125 may also be situated externally of camera 120. Image sensor 115 is designed to detect camera raw data 110. Preprocessing device 105 according to this exemplary embodiment forms part of image sensor 115, i.e., is situated integrated into image sensor 115, only by way of example. For example, image sensor 115 and preprocessing device 105 are implemented together in a hardware component, for example in a chip. Image processing unit 125 is implemented separately, for example in a further hardware component, for example in a further separate chip.

Figure 2:
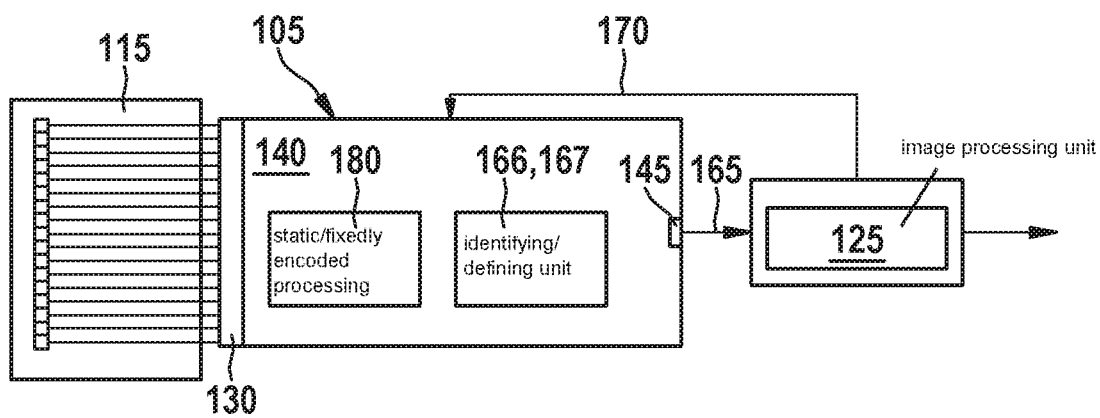
FIG. 2 shows a block diagram of a preprocessing device according to one exemplary embodiment of the present invention.

An alternative arrangement, in which preprocessing device 105 is implemented externally of image sensor 115, is described hereafter based on FIG. 2.

Preprocessing device 105 is designed to preprocess camera raw data 110 of image sensor 115 of camera 120. For this purpose, preprocessing device 105 includes a read-in unit 130, a setting unit 135, a reducing unit 140, and an output unit 145.

Read-in unit 130 is designed to read in a raw data signal 150, which encompasses camera raw data 110 detected by image sensor 115 at a detection point in time. Setting unit 135 is designed to set a preprocessing algorithm 160 for reducing the resolution of camera raw data 110, using a setting signal 155. Here, and also in connection with data described hereafter, the "resolution" refers to the spatial resolution, in addition or as an alternative to the temporal resolution, and in addition or as an alternative to the bit depth. As a result, the reduction of the resolution according to different exemplary embodiments, in arbitrary combination, encompasses all possible dimensions for the data reduction, i.e., spatial, temporal and related to the data themselves. A reduction of the bit depth for reducing the resolution is, for example, advantageous in image areas in which little texture is present, such as image areas depicting the sky. For example, an original bit depth may be reduced from 16 bits to, for example, 4 to 8 bits in suitable image areas.

Reducing unit 140 is designed to reduce the resolution of camera raw data 110, using preprocessing algorithm 160 set in setting unit 135, to obtain a preprocessed camera signal 165 which represents a preprocessed camera image. Output unit 145 is designed to output preprocessed camera signal 165 to image processing unit 125.

According to this exemplary embodiment of the present invention, reducing unit 140 is thus designed to reduce the spatial and/or temporal resolution of camera raw data 110 and/or the resolution with respect to the bit depth. Advantageously, a manner and a rate of the reduction may be continuously adapted. This is made possible in that the setting signal may be continuously regenerated and adapted to an instantaneous situation. In the process, both the image data detected by image sensor 115 as well as pieces of information independent of the image data may be taken into consideration.

According to this exemplary embodiment of the present invention, preprocessing device 105 includes an identifying unit 166, which is designed to identify a change between camera raw data 110 and chronologically preceding camera raw data, using preprocessing algorithm 160. In this way, a dynamic movement may be detected. Conventional methods of image evaluation may be used for this purpose. Preprocessing device 105 furthermore includes a defining unit 167, which is designed to define a setting parameter of setting signal 155 as a function of a parameter of the identified change. In this way, it is possible to respond very quickly to changes in surroundings of vehicle 100 detected by camera 120. For example, the resolution may be increased very quickly when it is identified by identifying unit 166 that a movement suddenly occurs in the previously static surroundings, for example, a previously standing person suddenly begins to walk. The resolution may advantageously already be increased even though an actual object recognition, which is carried out in image processing unit 125, for example, has not yet been carried out or completed.

In addition or as an alternative, preprocessing device 105 according to this exemplary embodiment includes an establishing unit 169, which is designed to establish a setting parameter of a further setting signal 170, using an external signal 175 which represents an object detection of image processing unit 125. In this way, the resolution may be increased, for example, when a person was identified, using image processing unit 125. In addition or as an alternative, establishing unit 169 is designed to establish a setting parameter of further setting signal 170, using a further external signal which represents an instantaneous piece of driving information of a trip of vehicle 100. The instantaneous piece of driving information may, for example, be provided by a sensor unit of vehicle 100. For example, the resolution may be increased when the further external signal indicates that the previously stationary vehicle 100 is set in motion.

According to an alternative exemplary embodiment, image processing unit 125 is not separately implemented, but is part of preprocessing device 105 and designed to process preprocessed camera signal 165.

According to this exemplary embodiment, by way of example, a spatial resolution of camera raw data 110 is 10 px/deg, and a temporal resolution is 120 Hz.

According to this exemplary embodiment, preprocessed camera signal 165 encompasses a preprocessed camera image having a reduced spatial resolution of 1 px/deg and a reduced temporal resolution of 10 Hz. In this way, both an image repetition rate and a number of pixels are reduced by the reduction.

Conventional methods may be resorted to for the reduction of the spatial resolution. For example, groups of pixels may be merged or individual pixels may be eliminated.

There is a trend in video cameras for various applications toward ever greater image resolutions, for example 8 to 16 megapixels (MP) and/or toward ever higher temporal sampling, for example 30 to 120 Hz. This trend is caused by the steadily rising requirements with respect to a detection of far away or small objects and the highly precise determination of their position, movement and class. At the same time, the number of cameras used is also rising to cover a preferably large number of viewing ranges. Example applications may be found in the field of driver assistance and of automated driving, but also in robotics or in the case of monitoring cameras. As a result of the increase of the temporal and spatial sampling and the number of cameras, the data traffic increases accordingly, so that the requirements with regard to the memory bandwidth, the transmission bandwidth, for example to a central processing unit, and the data evaluation, also increase. This necessarily results in higher system and energy costs. Since these costs are to be kept within reason, such high spatial and temporal resolutions in part cannot be processed at all with the aid of present hardware or software since simply too much data would have to be processed in too short a time. From a systemic point of view, however, it is often not even necessary to transmit and evaluate the images of all cameras at full temporal and spatial resolution. For example, when driving rapidly straight ahead on an expressway and with a camera 120 oriented in the driving direction, a high spatial resolution in the image center is important to enable a high detection range there. At the same time, however, the temporal resolution may be low there since movements in the image center have small amplitudes due to the large distance. In contrast, the procedure should be the opposite at the image margins. Here, a low spatial resolution is sufficient since objects are situated close to camera 120 anyhow. However, since the movements in the margin areas of the image may be very fast, the temporal sampling should be high here. As a result, there is considerable optimization potential by application-specific preprocessing of the camera data.

The example preprocessing device 105 described herein advantageously allows an application-controlled video preprocessing for the data reduction. In the process, an application-specific preprocessing of camera raw data 110 in the form of video data is carried out to provide the optimally processed data volume and data type sufficient for a particular application.

Preprocessing device 105 makes it possible to preprocess the data transmitted from one or multiple camera(s) 120, which may be video cameras, to image processing unit 125 in the form of an evaluation unit in such a way that the amount and the content of the data are optimally adapted to the particular application. This reduces the memory bandwidth, transmission bandwidth and requirements with regard to the data evaluation, and thus ultimately results in more cost-effective systems, without significant functional quality losses.

A main feature of the approach described here is based on a data preprocessing of camera raw data 110 with the goal of optimally adapting the amount and content of the data to the particular application in a content-related manner. According to one exemplary embodiment, primarily a spatial and/or temporal sampling of the preprocessed image is adapted in an application-specific manner in the process. According to one exemplary embodiment of the present invention, at fast straight-ahead driving, this is identified, according to one exemplary embodiment, by an external signal 175 in the form of a speed signal and/or a steering angle signal by a corresponding external sensor, on an expressway, and a camera 120 oriented in the driving direction, a high spatial resolution in the image center is carried out to enable a high detection range. At the same time, according to one exemplary embodiment of the present invention, however, a low temporal resolution is carried out in the image center since movements in the image center have small amplitudes due to the large distance. According to one exemplary embodiment, in contrast, the procedure is the opposite at the image margins. Here, a low spatial resolution is carried out since objects are situated close to camera 120 anyhow. However, since the movements in the margin areas of the image may be very fast, a high temporal sampling is carried out according to one exemplary embodiment.

According to one exemplary embodiment, an adaptation, for example within the context of quantity and content, of the image data to be transmitted from camera 120 advantageously takes place as early as possible in the signal chain, according to this exemplary embodiment, ideally directly in image sensor 115, so that only data which are relevant for the instantaneous application are transmitted from image sensor 115 to the evaluation unit.

According to an alternative exemplary embodiment, a downstream processing is carried out "near-sensor," as it is described in FIG. 2, e.g., in a preprocessing device 105 close to the sensor in the form of a so-called "near-sensor preprocessing unit," or "image signal processing" (ISP). FIG. 1 thus shows a signal flow for a sensor-internal preprocessing, and FIG. 2 shows a signal flow for a near-sensor preprocessing.

The data (pre)processing carried out by preprocessing device 105 may be differentiated according to the location in the signal chain where it takes place (sensor-internal or near-sensor), and according to the control variable which influences the processing, namely static/fixedly encoded, internally dynamically regulated, and/or externally dynamically regulated. Different application examples thus result depending on the control variable and the location of the processing in the signal chain, which are described hereafter:

According to one exemplary embodiment of the present invention, preprocessing device 105 encompasses a static/fixedly encoded processing 180. Static/fixedly encoded processing 180 is a non-regulated processing. According to one exemplary embodiment, an image area-specific, fixed resolution and image sampling or an image data compression fixedly set for the entire image take place in the process. According to one exemplary embodiment, such an application takes place as an optimization for a forwardly directed camera 120 in a vehicle 100 in which the central area is read in at a high spatial resolution and a low temporal sampling rate, and the margin areas are read in at a lower resolution and a high sampling rate. According to one exemplary embodiment, a fixed setting signal 181 is provided, using the static/fixedly encoded processing, which is also used for setting preprocessing algorithm 160.

According to one exemplary embodiment of the present invention, preprocessing device 105 encompasses an internally dynamically regulated processing. During the internally dynamically regulated processing, the image content is directly analyzed on image sensor 115 according to one exemplary embodiment, and it is analyzed in identifying unit 166 according to one exemplary embodiment, and areas including dynamically moving objects are detected at a higher temporal sampling rate and image resolution than non-inherently moving image areas. In the process, not only changes of the intensity value of individual pixels are responded to, but advantageously also results of more complex image processing algorithms.

According to one exemplary embodiment of the present invention, an externally dynamically regulated processing is used. "Externally" relates to algorithms in a later signal processing chain, e.g., the object detection in image processing unit 125, or other external sensors such as inertial measuring units (IMU), steering angles, vehicle speed, etc. According to one exemplary embodiment of the present inventin, the information of the movement of the camera itself from an inertial measuring unit, or the speed of the vehicle itself, is transmitted to image sensor 115 or preprocessing device 105 to establish the sampling rate and resolution per image region. According to one exemplary embodiment, a high spatial and low temporal resolution in the movement direction is carried out during fast driving, otherwise a low spatial and high temporal resolution, and an average spatial and temporal resolution, is carried out while driving slowly, on the entire image. According to one exemplary embodiment of the present invention, a steering angle at curve negotiations or in the case of image areas including functionally relevant dynamic objects are also represented as external control variables in the form of external signal 175.

In this way, preprocessing algorithm 160 may be adapted, using different setting signals 155, 170, 181. In the process, all these setting signals 155, 170, 181 or only one or a subgroup of these setting signals 155, 170, 181 may be used. The composition of the used setting signals 155, 170, 181 may also change depending on the situation.

According to one exemplary embodiment of the present invention, preprocessing algorithm 160 is designed to jointly process camera raw data 110 of all pixels of image sensor 122. As an alternative, preprocessing algorithm 160 encompasses multiple parallel preprocessing algorithms, each of the preprocessing algorithms being designed to only preprocess a portion of camera raw data 110. In this way, different image areas of the entire image detected by image sensor 122 may be assigned to preprocessing algorithms. Each of the preprocessing algorithms may be set separately, using at least one of setting signals 155, 170, 181.

FIG. 2 shows a block diagram of a preprocessing device 105 according to one exemplary embodiment of the present invention. It may be preprocessing device 105 described based on FIG. 1, with the difference that preprocessing device 105, in the form of a near-sensor preprocessing device 105, is situated externally of image sensor 115 and of image processing unit 125. For example, three hardware chips are provided, image sensor 115, preprocessing device 105, and image processing unit 125 each being implemented in a dedicated hardware chip.

According to this exemplary embodiment of the present invention, preprocessing device 105 is designed to directly read in setting signal 170 from image processing unit 125. Image processing unit 125 is thus designed to directly provide the setting signal. As an alternative, an establishing unit may be provided, as it is shown in FIG. 1.

Figure 3:
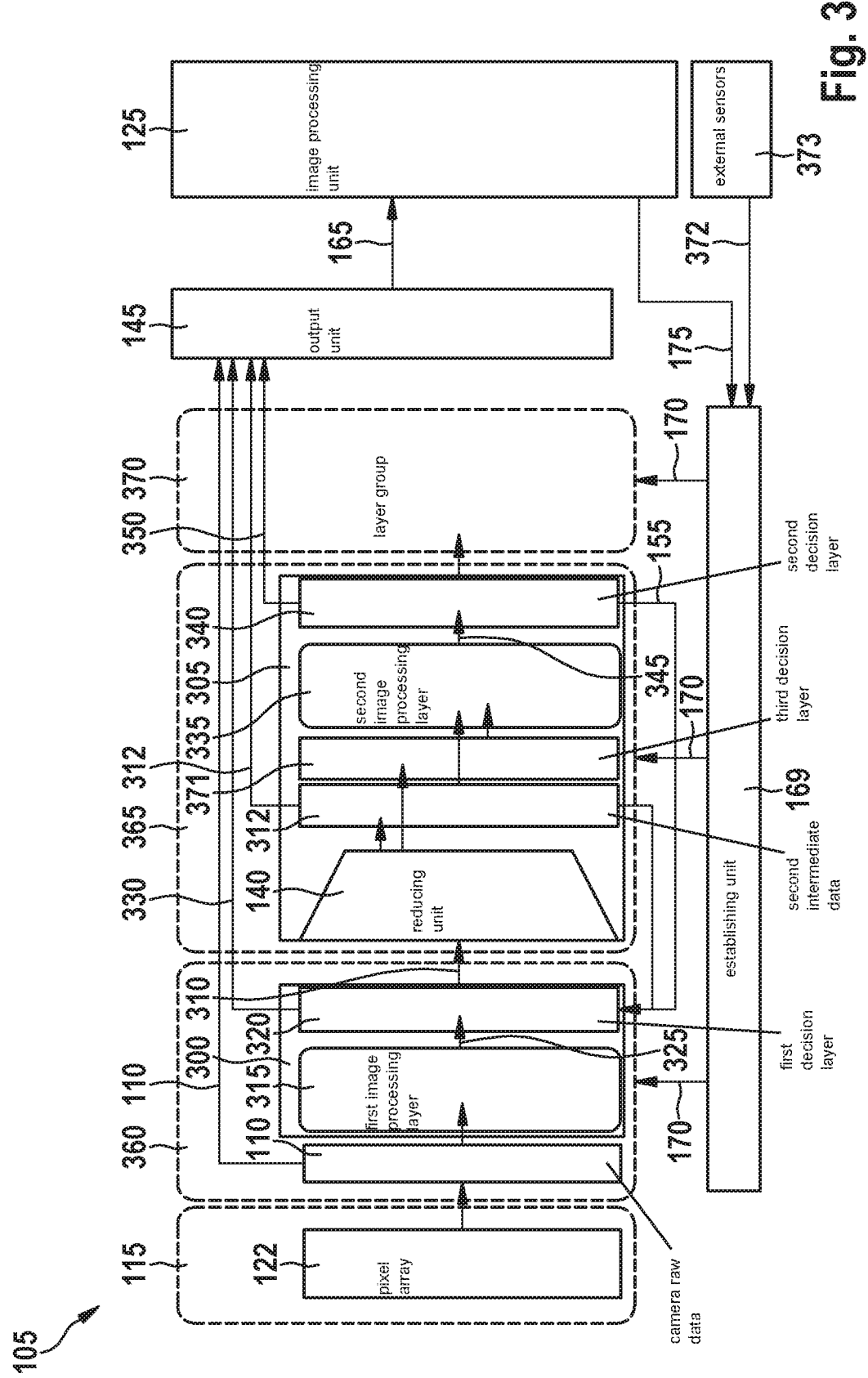
FIG. 3 shows a block diagram of a preprocessing device according to one exemplary embodiment of the present invention.

FIG. 3 shows a block diagram of a preprocessing device 105 according to one exemplary embodiment of the present invention. This may be preprocessing device 105 described based on FIG. 1 or 2.

Image sensor 122 for providing camera raw data 110 is shown, which according to this exemplary embodiment are preprocessed and reduced using three layer groups 360, 365, 370, so-called layers, to finally be output by output unit 145 to image processing unit 125. Layer group 370 is optional and may be implemented corresponding to layer group 365. Optionally, more than three layer groups 360, 365, 370 may also be provided. Establishing unit 169 for providing setting signal 170 is situated next to layer groups 360, 365, 370.

According to this exemplary embodiment of the present invention, the setting unit for setting the preprocessing algorithm described based on FIGS. 1 and 2 is designed to set a first sub-algorithm 300 for transforming camera raw data 110, using at least one of setting signals 155, 170, and a second sub-algorithm 305 for reducing the resolution of intermediate data 310, using at least one of setting signals 155, 170. First sub-algorithm 300 is designed to transform camera raw data 110 and provide them as intermediate data 310. Reducing unit 140 is designed to reduce the resolution of intermediate data 310, using the set second sub-algorithm 305, to obtain second intermediate data 312.

According to this exemplary embodiment of the present invention, first sub-algorithm 300 includes a first image processing layer 315 and a first decision layer 320, first decision layer 320 being designed to make a first output decision 330 for outputting camera raw data 110 and provide them to output unit 145, using a first signal 325 of first image processing layer 315. Second sub-algorithm 305 includes a second image processing layer 335 and a second decision layer 340, second decision layer 340 being designed to make a second output decision 350 for outputting second intermediate data 312 and provide them to output unit 145, using a second signal 345 of second image processing layer 335. Furthermore, both camera raw data 110 and second intermediate data 312 are provided by layer groups 360, 365 to output unit 145.

According to this exemplary embodiment of the present invention, output unit 145 is designed to output camera raw data 110 or second intermediate data 312 as preprocessed camera raw signal 165 as a function of first output decision 330 and second output decision 350.

FIG. 3 thus shows one exemplary embodiment of a processing chain for the content-based control of image resolution and sampling rate.

In a layered design of preprocessing device 105 according to this exemplary embodiment, one or multiple processing layer(s), which may also be referred to as layer groups 360, 365, 370, is/are formed under pixel array 122, which may also be referred to as a "pixel layer," of image sensor 115.

According to this exemplary embodiment of the present invention, the processing chain is thus directly implemented as a multilayer design at pixel array 122. According to an alternative exemplary embodiment, a near-sensor image signal processor (ISP), situated directly downstream from sensor 115, takes over this processing. In the case of a pure software implementation, the individual layer groups 360, 365, 370 form conceptional units.

According to this exemplary embodiment of the present invention, image sensor 115 in a first position records images at a preferably high image rate, i.e., 120 Hz, with its pixel layer. Per image recording, the image data are in each case advanced one layer group 360, 365, 370 and processed there. FIG. 3 only shows two processing layer groups 360, 365 in detail; according to one exemplary embodiment, third layer group 370 is attached to processing chain, as shown, and may be configured corresponding to one of the preceding layer groups 360, 365. In the shown system including image sensor 115 in the form of a sensor layer and multiple layer groups 360, 365 in the form of at least two calculation layers, image sensor 115 includes the image of point in time t, the downstream first layer group 360 includes the image of point in time t−dt, and second layer group 365 includes the image of point in time t−2*dt, "dt" being the time difference between two image recordings.

There are image processing layers 140, 315, 335 and decision layers 320, 340. According to this exemplary embodiment of the present invention, second layer group 365 furthermore includes a third decision layer 371 situated upstream from second image processing layer 335 and designed to make a decision, using a third signal from reducing unit 140. Image processing layers 315, 335 transform local image areas, and decision layers 320, 340, 371 make a decision based thereon as to whether the local image area is to be transmitted. According to one exemplary embodiment, decision layers 320, 340 also include the results of the respectively following layer. According to one exemplary embodiment, image processing layers 315, 335 also include external signals 372 including external data of external sensors 373, such as instantaneous IMU data or results of downstream, external algorithms.

In the case of a direct hardware implementation on image sensor 115, image processing layers 315, 335 implement image processing operations for the respective pixel areas situated thereabove. According to one exemplary embodiment of the present invention, in the simplest case this is a convolution operation for a 3×3 pixel area, or a convolution followed by a non-linear transformation, such as in a convolutional neural network (CNN). For each pixel area, a separate calculation unit exists for this purpose, so that the entire image may be processed in parallel. In the case of a downstream ISP, according to one alternative exemplary embodiment a parallel processing of all image areas is also implemented in hardware.

After first layer group 360 and each further layer group 365, 370 and the associated decision matrix are reduced in the resolution in reducing units 140, according to one exemplary embodiment to one quarter, similarly to a Gaussian pyramid. This is then the input of next layer group 370.

According to this exemplary embodiment of the present invention, the images and decision matrices of all layer groups 360, 365, 370 are all accessible to output unit 145 in the form of an output layer, which according to this exemplary embodiment generates the output of the system per image cycle. According to this exemplary embodiment, the output of the system is only made up of the image areas in which the associated decision layer 320, 340 has assessed the corresponding area as significant. One goal of the overall system is to output image areas in the respective resolution and image rate which correspond to their relevance. What is considered relevant depends on the function at the system level. Depending on function, the processing chain may be parameterized differently. According to one exemplary embodiment of the present invention, the parameterization is calculated by optimization methods based on examples. What is important is that image processing unit 125 or a central control unit, which has to process the image data of a large number of cameras, receives a data volume which is preferably reduced to what is relevant. Preprocessing device 105 enables this by outputting preprocessed camera signal 165.

Preprocessing device 105 may be used in automotive video products or in near range cameras and/or for driver assistance systems. A use is also useful in the context of central control units, such as expressway assistance systems. The use of preprocessing unit 105 is not limited to automotive video products, but may be used in general in connection with image processing systems.

Figure 4:
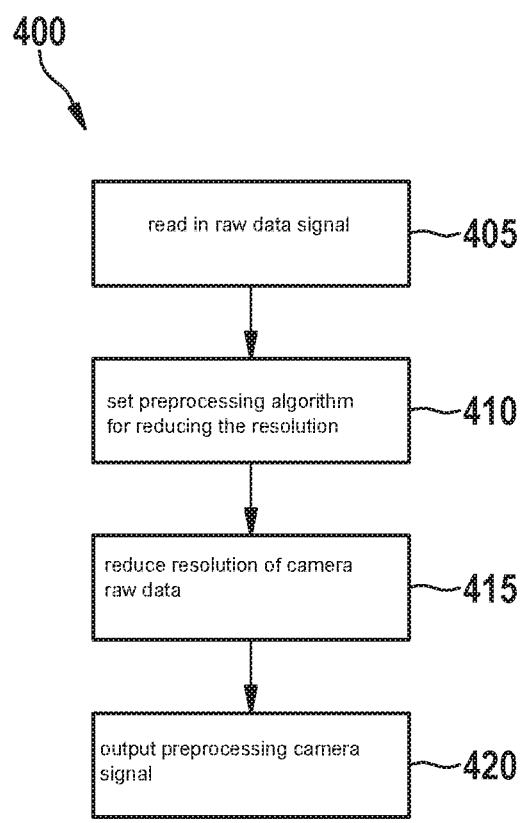
FIG. 4 shows a flow chart of a method for preprocessing camera raw data of an image sensor of a camera according to one exemplary embodiment of the present invention.

FIG. 4 shows a flow chart of a method 400 for preprocessing camera raw data of an image sensor of a camera according to one exemplary embodiment of the present invention. This may be a method 400 which is executable by one of the preprocessing devices described based on one of the preceding figures.

Method 400 includes a step 405 of reading in, a step 410 of setting, a step 415 of reducing, and a step 420 of outputting. In step 405 of reading in, a raw data signal is read in, which encompasses camera raw data detected by the image sensor at a detection point in time. In step 410 of setting, a preprocessing algorithm for reducing the resolution of the camera raw data is set, using at least one setting signal. In step 415 of reducing, the resolution of the camera raw data is reduced, using the preprocessing algorithm set in step 410 of setting, to obtain a preprocessed camera signal which represents a preprocessed camera image. In step 420 of outputting, the preprocessed camera signal is output to an image processing unit.

What is claimed is:

1. A method for preprocessing camera raw data of an image sensor of a camera, the method comprising:
    reading in a raw data signal which encompasses camera raw data detected by the image sensor at a detection point in time;
    setting a preprocessing algorithm for reducing a resolution of the camera raw data, using at least one setting signal;
    reducing the resolution of the camera raw data, using the preprocessing algorithm set in the setting, to obtain a preprocessed camera signal which represents a preprocessed camera image; and
    outputting the preprocessed camera signal to an image processing unit;
    wherein in the setting, a first sub-algorithm for transforming the camera raw data is set, using the at least one setting signal, and a second sub-algorithm for reducing a resolution of intermediate data is set, using the at least one setting signal, and
    wherein in the reducing, the camera raw data are transformed, using the first sub-algorithm set in the setting, to obtain the intermediate data, and the resolution of the intermediate data is reduced, using the second sub-algorithm set in the setting, to obtain second intermediate data.

2. The method as recited in claim 1, wherein, in the reducing, the resolution of the camera raw data is reduced by a reduction of: a spatial resolution of the camera raw data and/or a temporal resolution of the camera raw data and/or a bit depth of the camera raw data.

3. The method as recited in claim 1, further comprising: detecting the camera raw data using the image sensor.

4. The method as recited in claim 1, wherein the reading in, setting, reducing, and outputting, are carried out using the image sensor or a preprocessing device situated externally of the image sensor and the image processing unit.

5. The method as recited in claim 1, further comprising:
identifying a change between the camera raw data and preceding camera raw data, using the preprocessing algorithm, to detect a dynamic movement; and
defining a setting parameter of the setting signal as a function of a parameter of the identified change.

6. The method as recited in claim 1, further comprising:
establishing a setting parameter of a further setting signal:
(i) using an external signal which represents an instantaneous piece of driving information of a trip of the vehicle, or (ii) using a further external signal which represents an object detection of the image processing unit.

7. The method as recited in claim 1, further comprising:
processing the preprocessed camera signal, using the image processing unit.

8. The method as recited in claim 1, wherein the first sub-algorithm includes a first image processing layer and a first decision layer, the first decision layer being configured to make a first output decision for outputting the camera raw data, using a first signal of the first image processing layer, and wherein the second sub-algorithm includes a second image processing layer and a second decision layer, the second decision layer being configured to make a second output decision for outputting the second intermediate data, using a second signal of the second image processing layer.

9. The method as recited in claim 8, wherein, in the outputting, the camera raw data or the second intermediate data are output as the preprocessed camera signal as a function of the first output decision and the second output decision.

10. A preprocessing apparatus for preprocessing camera raw data of an image sensor of a camera, comprising:
a preprocessing device configured to perform the following:
reading in a raw data signal which encompasses camera raw data detected by the image sensor at a detection point in time;
setting a preprocessing algorithm for reducing a resolution of the camera raw data, using at least one setting signal;
reducing the resolution of the camera raw data, using the preprocessing algorithm set in the setting, to obtain a preprocessed camera signal which represents a preprocessed camera image; and
outputting the preprocessed camera signal to an image processing unit;
wherein in the setting, a first sub-algorithm for transforming the camera raw data is set, using the at least one setting signal, and a second sub-algorithm for reducing a resolution of intermediate data is set, using the at least one setting signal, and
wherein in the reducing, the camera raw data are transformed, using the first sub-algorithm set in the setting, to obtain the intermediate data, and the resolution of the intermediate data is reduced, using the second sub-algorithm set in the setting, to obtain second intermediate data.

11. A non-transitory computer readable medium, on which is stored a computer program, which is executable by a processor, comprising:
a program code arrangement having program code for preprocessing camera raw data of an image sensor of a camera, by performing the following:
reading in a raw data signal which encompasses camera raw data detected by the image sensor at a detection point in time;
setting a preprocessing algorithm for reducing a resolution of the camera raw data, using at least one setting signal;
reducing the resolution of the camera raw data, using the preprocessing algorithm set in the setting, to obtain a preprocessed camera signal which represents a preprocessed camera image; and
outputting the preprocessed camera signal to an image processing unit;
wherein in the setting, a first sub-algorithm for transforming the camera raw data is set, using the at least one setting signal, and a second sub-algorithm for reducing a resolution of intermediate data is set, using the at least one setting signal, and
wherein in the reducing, the camera raw data are transformed, using the first sub-algorithm set in the setting, to obtain the intermediate data, and the resolution of the intermediate data is reduced, using the second sub-algorithm set in the setting, to obtain second intermediate data.

12. The computer readable medium as recited in claim 11, wherein the first sub-algorithm includes a first image processing layer and a first decision layer, the first decision layer being configured to make a first output decision for outputting the camera raw data, using a first signal of the first image processing layer, and wherein the second sub-algorithm includes a second image processing layer and a second decision layer, the second decision layer being configured to make a second output decision for outputting the second intermediate data, using a second signal of the second image processing layer.

13. The computer readable medium as recited in claim 12, wherein, in the outputting, the camera raw data or the second intermediate data are output as the preprocessed camera signal as a function of the first output decision and the second output decision.

14. The apparatus as recited in claim 10, wherein the first sub-algorithm includes a first image processing layer and a first decision layer, the first decision layer being configured to make a first output decision for outputting the camera raw data, using a first signal of the first image processing layer, and wherein the second sub-algorithm includes a second image processing layer and a second decision layer, the second decision layer being configured to make a second output decision for outputting the second intermediate data, using a second signal of the second image processing layer.

15. The apparatus as recited in claim 14, wherein, in the outputting, the camera raw data or the second intermediate data are output as the preprocessed camera signal as a function of the first output decision and the second output decision.

* * * * *